(12) United States Patent
May et al.

(10) Patent No.: US 7,248,406 B2
(45) Date of Patent: Jul. 24, 2007

(54) PROJECTION SCREEN

(75) Inventors: Gregory J. May, Corvallis, OR (US); William J. Allen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 10/966,009

(22) Filed: Oct. 15, 2004

(65) Prior Publication Data

US 2006/0082876 A1    Apr. 20, 2006

(51) Int. Cl.
*G03B 21/60* (2006.01)
*G02B 27/10* (2006.01)
*G02B 5/08* (2006.01)
*G02B 7/182* (2006.01)

(52) U.S. Cl. .................. 359/452; 359/459; 359/627; 359/850

(58) Field of Classification Search ........ 359/452–453, 359/443, 459, 627, 850
See application file for complete search history.

(56) References Cited

U.S. PATENT DOCUMENTS

| | | | |
|---|---|---|---|
| 3,355,311 A * | 11/1967 | Gosselink ............. | 428/327 |
| 3,383,153 A | 5/1968 | Vetter | |
| 6,076,933 A | 6/2000 | DiLoreto et al. | |
| 6,144,491 A * | 11/2000 | Orikasa et al. ........... | 359/452 |
| 6,233,095 B1 * | 5/2001 | Niwa et al. ............. | 359/443 |
| 6,535,333 B1 | 3/2003 | Piepel et al. | |
| 6,567,215 B2 | 5/2003 | Ballen et al. | |
| 6,692,647 B2 | 2/2004 | Moshrefzadeh et al. | |
| 6,961,175 B2 * | 11/2005 | Toda et al. ............... | 359/452 |
| 2001/0015846 A1 | 8/2001 | Morris et al. | |
| 2002/0126377 A1 | 9/2002 | Nakagawa et al. | |
| 2004/0057110 A1 | 3/2004 | Adachi et al. | |
| 2004/0070824 A1 | 4/2004 | Toda et al. | |
| 2004/0100692 A1 | 5/2004 | Hou | |

FOREIGN PATENT DOCUMENTS

| | | |
|---|---|---|
| JP | 07-270915 | 10/1995 |
| WO | WO9838320 | 8/1998 |
| WO | WO 03/042725 A2 | 5/2003 |

OTHER PUBLICATIONS

International Search Report dated Feb. 6, 2006.

* cited by examiner

*Primary Examiner*—W. B. Perkey
*Assistant Examiner*—Magda Cruz

(57) ABSTRACT

A projection screen has first transparent particles tinted a first color and second transparent particles tinted a second color.

13 Claims, 5 Drawing Sheets

PROJECTION SCREEN

BACKGROUND

Projection screens may display images projected thereon by projectors. Some types of projection screens may absorb colors of the projected light. This may result in lost light to the viewer as compared to the light from a fully diffusive surface. Additionally, these types of projection screens may act as diffuse reflectors and therefore a substantial portion of the reflected light may not be directed back toward the viewer.

DETAILED DESCRIPTION

In the following detailed description of the present embodiments, reference is made to the accompanying drawings that form a part hereof, and in which is shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
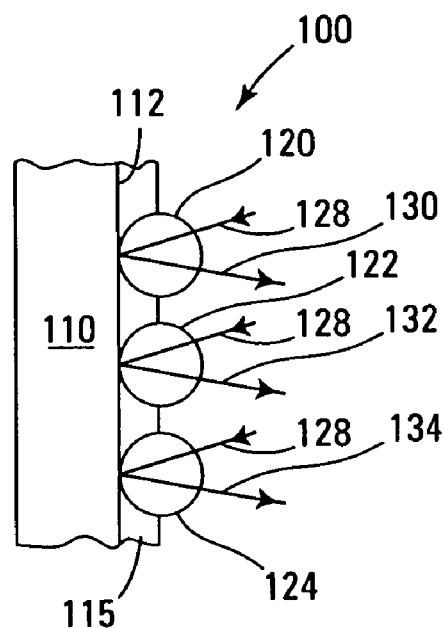
FIG. 1 illustrates a portion of an embodiment of a frontal projection screen, according to an embodiment of the disclosure.

FIG. 1 illustrates a portion of a frontal projection screen 100, according to an embodiment. Screen 100 includes a substrate 110 that may be flexible or substantially rigid. For one embodiment, substrate 110 may include a mirror reflector, e.g., is silvered or mirrored; for another embodiment, substrate 110 may include a diffusive reflector, e.g., is white; and for another embodiment, substrate 110 may include a dark light absorber, e.g., black or gray. Transparent particles 120, 122, and 124, such as spheres, ellipsoids, etc., e.g., of glass or plastic, may, in one embodiment, be adhered to substrate 110 using an opaque or transparent adhesive 115. Particles 120, 122, and 124 are in direct contact or otherwise in optical contact with substrate 110 so that light can pass through particles 120, 122, and 124 and reach substrate 110. For one embodiment each of particles 120, 122, and 124 is tinted a different color, e.g., particle 120 is tinted green, particle 122 red, and particle 124 blue. For various embodiments, dyes, pigments, interference coatings, dichroic coatings, etc. can be used to tint particles 120, 122, and 124. For other embodiments, two different colors, such as magenta and green, four colors, e.g., cyan, magenta, yellow, and black, etc., are used instead of three. For another embodiment, particles 120, 122, and 124 are respectively tinted cyan, magenta, and yellow.

For other embodiments, adhesive 115 may have a substantially different refractive index than particles 120, 122, and 124 and covers a part of the rear surface of each of particles 120, 122, and 124 to define how the screen reacts to ambient light coming from different angles. For these embodiments, substrate 110 may be a mirror reflector, diffusive surface, or dark absorber. Different colored particles are used so that the screen is tuned to the projector system lamp plus color filtering coming from the projector.

In operation, each of particles 120, 122, and 124 receives light 128 from a projector. The light passes through particles 120, 122, and 124 and is reflected by substrate 110. The reflected light passes back through particles 120, 122, and 124 and respectively exits particles 120, 122, and 124 as beams 130, 132, and 134. Beams 130, 132, and 134 are respectively the colors of particles 120, 122, and 124. That is, each of particles 120, 122, and 124 passes its like color component of light 128, e.g., particles 120, 122, and 124 respectively pass green, red, and blue, and absorbs the other color components, e.g., particle 120 absorbs red and blue, particle 122 absorbs green and blue, and particle 124 absorbs green and red.

The respective particles 120, 122, and 124 in concert with substrate 110 can have a retroreflective property. Retroreflectivity may be defined as reflecting light substantially parallel to incoming light. Therefore, the light is reflected back through particles 120, 122, and 124 has a narrower viewing cone than diffuse reflections off of opaque particles. For example, the viewing cone of the light passed back through particles 120, 122, and 124 will be narrow compared to a purely diffuse reflection, e.g., about less than 5 degrees reflecting substantially back to the projector, whereas a purely diffuse reflection, e.g., of a white surface, has nearly about a 180-degree viewing cone, i.e., 90 degrees on either side of the perpendicular to surface 112. The smaller viewing cone results in screen (or optical) gain and enables more light to be reflected back the viewers. This acts to compensate for the lost light absorbed by the colored particles.

For some embodiments, particles 120, 122, and 124 may be of the same size or of different sizes. Changing the particle size changes the amount of like colored light that is reflected by a particle and the amount of unlike colored light that is absorbed by that particle. Different ratios of one color to another can be used to achieve a similar purpose for other embodiments.

Figure 2:
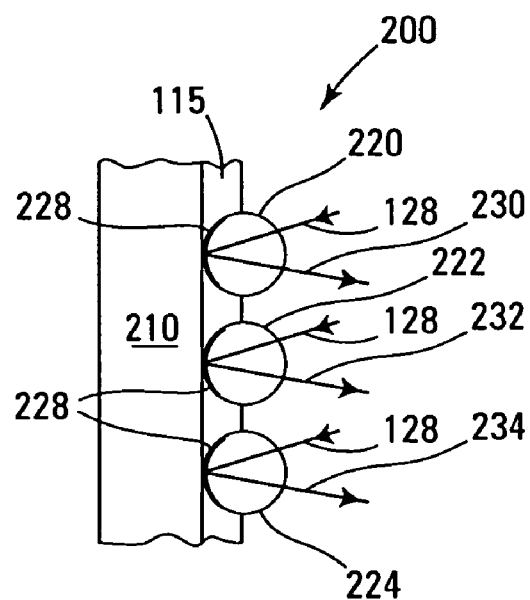
FIG. 2 illustrates a portion of an embodiment of a frontal projection screen, according to another embodiment of the disclosure.

FIG. 2 illustrates a portion of a frontal projection screen 200, according to another embodiment. For one embodiment, transparent particles 220, 222, and 224 are respectively tinted different colors, e.g., particle 220 is tinted green, particle 222 red, and particle 224 blue, and are adhered to a substrate 210 using adhesive 115. Substrate 210 may be as described for substrate 110 or may be a dark absorber to increase ambient absorption. For another embodiment, two different colors, such as magenta and green, four colors, e.g., cyan, magenta, yellow, and black, etc., are used instead of three. For another embodiment particles 220, 222, and 224 are respectively tinted cyan, magenta, and yellow. A portion 228 of each of the particles 220, 222, and 224 adjacent substrate 210, e.g., the backs of particles 220, 222, and 224, are coated with a coating that is substantially a mirror reflector, e.g., a silvered or mirrored coating, and for another embodiment, a coating that is substantially a diffusive reflector, e.g., a white coating. Particles 220, 222, and 224 may be of the same size or of different sizes. For other embodiments, adhesive 115 may have a substantially different refractive index than particles 220, 222, and 224 and covers a part of the rear surface of each of particles 220, 222, and 224 to define how the screen reacts to ambient light coming from different angles.

In operation, each of particles 220, 222, and 224 receives light 128 from the projector. The light passes through particles 220, 222, and 224 and is reflected by the coating. The reflected light passes back through particles 220, 222, and 224 and respectively exits particles 220, 222, and 224 as beams 230, 232, and 234, respectively having the colors of particles 220, 222, and 224. That is, each of particles 220, 222, and 224 reflects its like color component of light 128 and absorbs the other color components. Each of particles 220, 222, and 224 has a retroreflective property that narrows the viewing cone unless the beads have a diffuse coating.

For another embodiment, portion 228 of each of particles 220, 222, and 224 is tinted a different color, e.g., green, red, or blue, magenta or green, cyan magenta, or yellow, etc., and the remaining portion of each of particles 220, 222, and 224 is untinted or clear. For this embodiment, the light passes through particles 220, 222, and 224 and is retroreflected by the respective one of the tinted portions 228. The retroreflected light passes back through particles 220, 222, and 224 and respectively exits particles 220, 222, and 224 as beams 230, 232, and 234, respectively having the colors of colored coatings. That is, each of the colored coatings reflects its like color component of light 128 through its corresponding particle and absorbs the other color components.

Figure 3A:
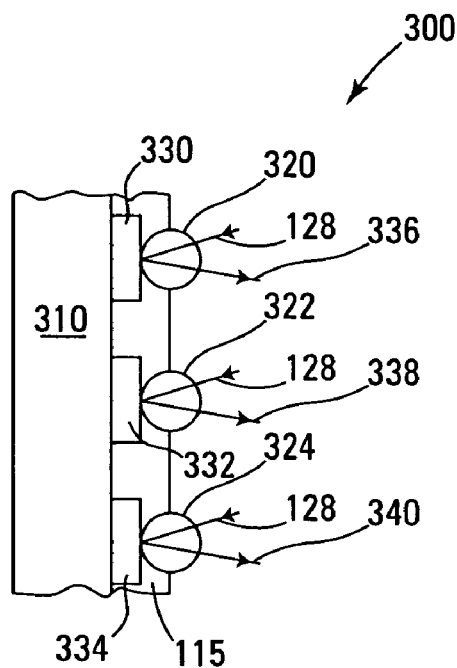
FIG. 3A illustrates a portion of an embodiment of a frontal projection screen, according to another embodiment of the disclosure.

FIG. 3A illustrates a portion of a frontal projection screen 300, according to another embodiment. Colored particles 330, 332, and 334 are adhered to a substrate 310 of screen 300, e.g., colored particle 330 is green, colored particle 332 red, and colored particle 334 blue. Substrate 310 may be as described for substrate 115 or may be gray, etc. Colored particles 330, 332, and 334 may be opaque substantially diffusive reflectors (or color dots) or substantially mirror reflectors. Clear transparent particles 320, 322, 324 are respectively adhered to colored particles 330, 332, and 334 by adhesive 115 so that they are in contact or otherwise in optical contact with their respective colored particle. Particles 320, 322, and 324 and colored particles 330, 332, and 334 may all be of the same size or be of different sizes. For another embodiment, two different colors, such as magenta and green, four colors, e.g., cyan, magenta, yellow, and black, etc., are used instead of three. For another embodiment colored particles 330, 332, and 334 are respectively cyan, magenta, and yellow.

Figure 3B:
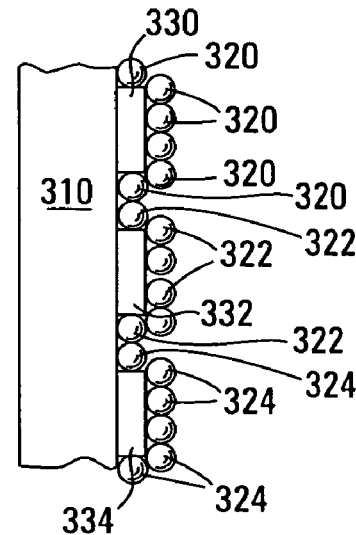
FIG. 3B illustrates a portion of an embodiment of a frontal projection screen, according to yet another embodiment of the disclosure.

According to another embodiment, FIG. 3B illustrates that particles 320, 322, and 324 do not have to have a one-to-one relationship with colored particles 330, 332, and 334, as in FIG. 3A. Rather, particles 320, 322, and 324 can be located between successive colored particles 330, 332, and 334, and/or more than one of particles 320, 322, or 324 can be adhered to a respective colored particle 330, 332, or 334.

In operation, each of particles 320, 322, and 324 receives light 128 from the projector. The light passes through particles 320, 322, and 324 and is reflected by the respective one of colored particles 330, 332, and 334. The reflected light passes back through particles 320, 322, and 324 and respectively exits particles 320, 322, and 324 as beams 336, 338, and 340, respectively having the colors of colored particles 330, 332, and 334. That is, each of colored particles 330, 332, and 334 reflects its like color component of light 128 through its corresponding particle and absorbs the other color components. Each of particles 320, 322, and 324 and its corresponding one of colored particles 330, 332, and 334 has a retroreflective property that narrows the viewing cone.

Figure 4A:
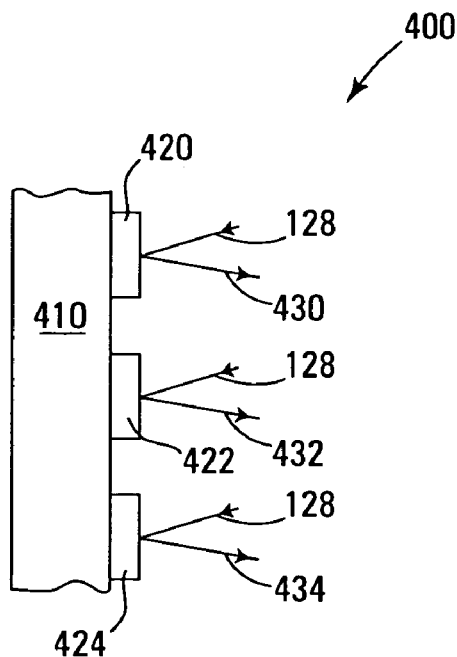
FIG. 4A illustrates a portion of an embodiment of a frontal projection screen, according to another embodiment of the disclosure.
Figure 4B:
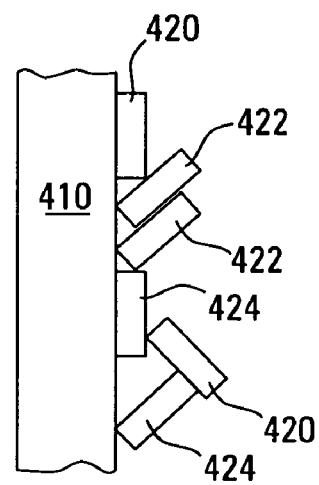
FIG. 4B illustrates a portion of an embodiment of a frontal projection screen, according to still another embodiment of the disclosure.

FIG. 4A illustrates a portion of a frontal projection screen 400, according to another embodiment. Tinted mirror reflectors 420, 422, and 424, such as mica particles, each tinted a different color, e.g., reflector 420 is tinted green, reflector 422 red, and reflector 424 blue, are adhered to a substrate 410 of screen 400. For various embodiments dyes, pigments, interference coatings, dichroic coatings, etc. can be used to tint mirror reflectors 420, 422, and 424. Substrate 410 may be as described for substrate 110 or may be gray, etc. Reflectors 420, 422, and 424 may all be of the same size or be of different sizes and of different color ratios. For another embodiment, two different colors, such as magenta and green, four colors, e.g., cyan, magenta, yellow, and black, etc., are used instead of three. For another embodiment reflectors 420, 422, and 424 are respectively tinted cyan, magenta, and yellow. According to another embodiment, FIG. 4B illustrates that reflectors 420, 422, and 424 can be randomly distributed, do not necessarily lie flat on substrate 410, or may overlap each other.

In operation, each of reflectors 420, 422, and 424 receives light 128 from the projector and respectively reflects it as beams 430, 432, and 434, respectively having the colors of reflectors 420, 422, and 424. That is, each of reflectors 420, 422, and 424 reflects its like color component of light 128 and absorbs the other color components. Each of reflectors 420, 422, and 424 has a narrower viewing cone than a diffusive reflector. The narrower viewing cone results in screen gain and enables more light to be reflected back toward the viewers. This acts to compensate for the lost light absorbed by the colored reflectors.

Figure 5:
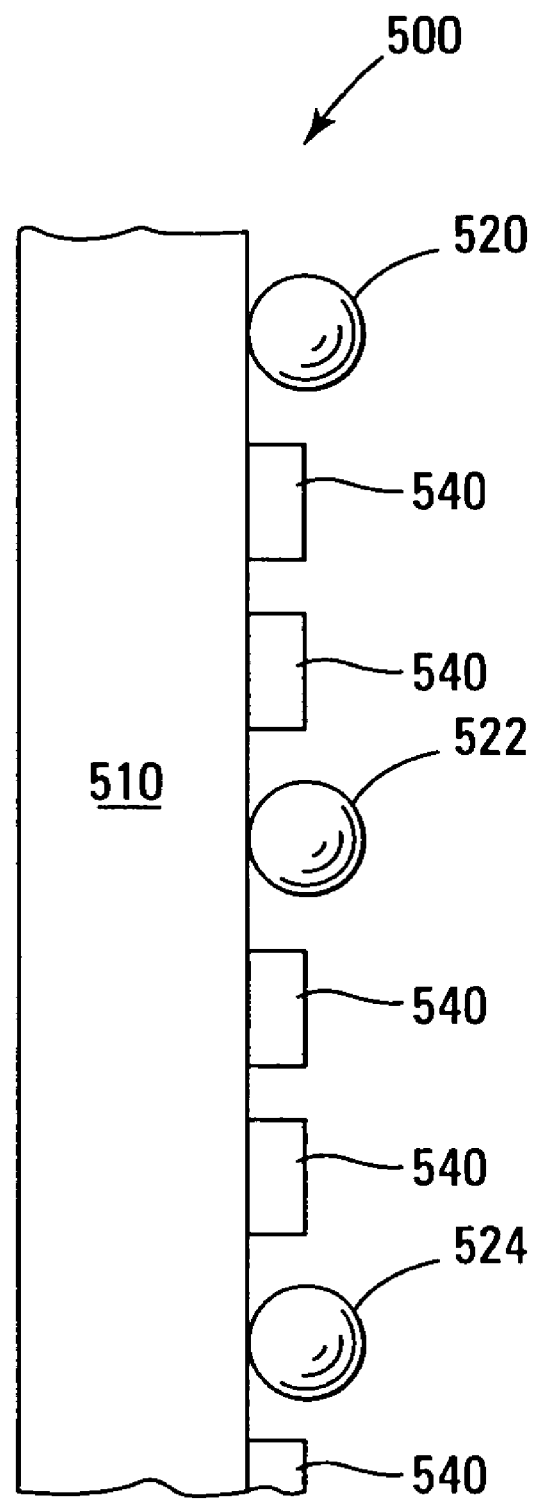
FIG. 5 illustrates a portion of an embodiment of a frontal projection screen, according to another embodiment of the disclosure.

FIG. 5 illustrates a portion of a frontal projection screen 500, according to another embodiment. For one embodiment, frontal projection screen 500 is as described above for screen 100, 200, 300, or 400 respectively of FIGS. 1, 2, 3A and 3B, and 4A and 4B, and includes colored elements 520, 522, and 524, each corresponding to a different color, adhered to a substrate 510. For one embodiment, colored elements 520, 522, and 524 represent the colored elements in FIGS. 1, 2, 3A and 3B, and 4A and 4B, i.e., tinted transparent particles affixed to a diffuse, mirror, or light absorbing screen substrate (FIG. 1) or having a diffuse or mirror coating applied to the backs thereof (FIG. 2), clear particles with a tint applied to the backs thereof (FIG. 2), clear particles in optical contact with a color dot (FIGS. 3A or 3B), and/or a tinted mirror reflector (FIG. 4). Note that each of colored elements 520, 522, and 524 may represent a plurality of colored elements, each plurality including colored elements from FIGS. 1, 2, 3A and 3B, and/or 4A and 4B. Screen 500 also includes diffusive reflectors 540, such as color dots, of different colors adjacent colored elements 520, 522, and 524. For one embodiment, the colors of diffusive reflectors 540 are the same colors as colored elements 520, 522, and 524. That is, each diffusive reflector 540 may be green, red or blue, magenta or green, cyan, magenta, yellow, or black, cyan, magenta, or yellow, etc. Diffusive reflectors 540 act to tone down retroreflectivy or mirror reflectivity.

Figure 6:
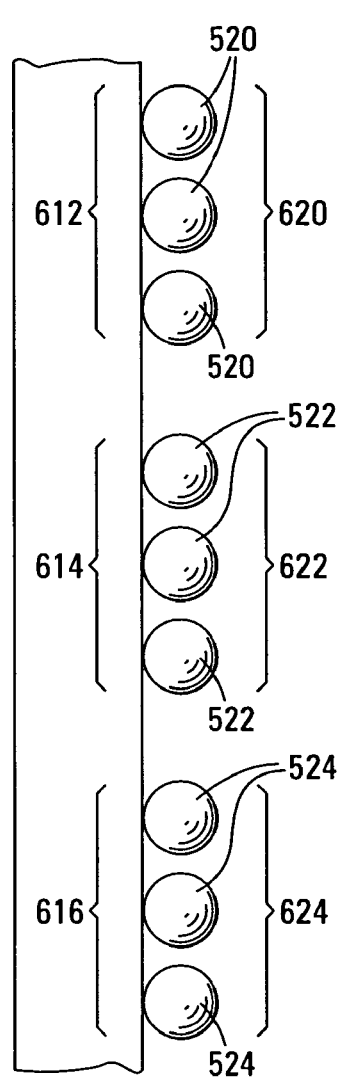
FIG. 6 illustrates a portion of an embodiment of a frontal projection screen, according to another embodiment of the disclosure.

The colored elements 520, 522, and 524 may be evenly distributed so that each has an unlike colored element next to it. Alternatively, as illustrated in FIG. 6, according to another embodiment, a frontal projection screen 600 has regions 612, 614, and 616 that may respectively include groups 620, 622, and 624 of like colored elements, i.e., colored elements 520, 522, and 524, respectively. For example, region 612 may include group 620 that may include only green colored elements, region 614 group 622 that may include only red colored elements, and region 616 group 624 that may include only blue colored elements.

Figure 7:
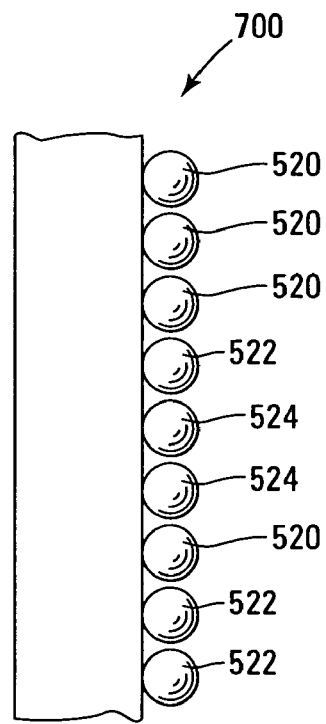
FIG. 7 illustrates a portion of an embodiment of a frontal projection screen, according to another embodiment of the disclosure.

For other embodiments, the colored elements 520, 522, and 524 may be randomly distributed, as shown for a portion of a frontal projection screen 700 in FIG. 7, according to another embodiment. It is seen that for a random distribution unlike colored elements may be immediately next to each other and like colored elements may be immediately next to each other.

Figure 8:
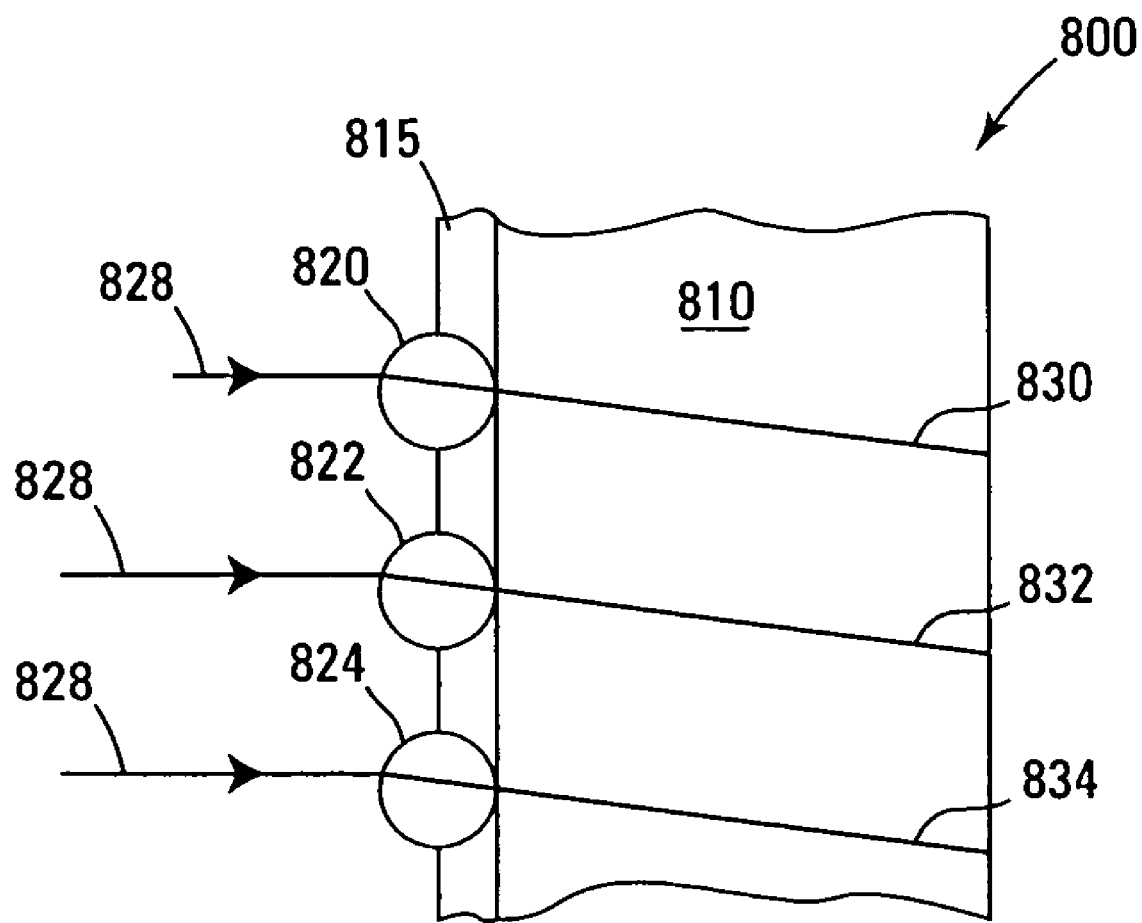
FIG. 8 illustrates a portion of an embodiment of a rear projection screen, according to another embodiment of the disclosure.

FIG. 8 illustrates a rear projection screen 800, according to another embodiment. Screen 800 includes a transparent substrate 810 having color tinted transparent particles 820, 822, and 824 adhered thereto by a transparent or opaque adhesive 815. Transparent particles 820, 822, and 824 are in direct contact or otherwise optical contact with transparent substrate 810 so that light can pass through particles 820, 822, and 824 and reach substrate 810. For one embodiment, particles 820, 822, and 824 are respectively tinted green, red, and blue. Particles 820, 822, and 824 may all be of the same size or be of different sizes. For another embodiment, two different colors, such as magenta and green, etc., are used instead of three. For another embodiment particles 820, 822, and 824 are respectively tinted cyan, magenta, and yellow. Particles 820, 822, and 824 may be distributed as described above. That is, particles 820, 822, and 824 may be evenly distributed, randomly distributed, or be evenly distributed in groups of like colored elements.

In operation, each of particles 820, 822, and 824 receives light 828 from a rear projector. Particles 820, 822, and 824 respectively pass a like color component of light 828 as beams 830, 832, and 834, which are subsequently transmitted through substrate 810, and absorb unlike color components of light 828. For example, particle 820 passes green and absorbs red and blue; particle 822 passes red and absorbs green and blue; and particle 824 passes blue and absorbs green and red. Particles 820, 822, and 824 act to reinforce their like color components.

For some embodiments, colored elements, such as tinted transparent particles, colored diffusive reflecting opaque particles, (or color dots), and/or tinted mirror reflecting particles (e.g., mica particles), are mixed together, e.g., in equal or unequal ratios by color and/or size, and are subsequently dispensed on an adhesive layer on a substrate of a frontal projection screen. For one embodiment, a transparent or an opaque film having adhesive on two sides can be used. For this embodiment, the mixed colored elements are dispensed onto one of the adhesive sides and the film containing the mixed colored elements is affixed to the substrate by the adhesive of the other side. This method can be used to apply color-tinted particles 820, 822, and 824 to substrate 810 of the rear projection screen 800 of FIG. 8.

Another method includes depositing (printing) adhesive in a pattern on an adhesive-backed transparent or opaque sheet, affixing colored elements of one color to that adhesive pattern, repeating for the remaining colors, and adhering the adhesive-backed material to a frontal projection screen. Alternatively, this method can be used to affix the colored elements to a flexible opaque (mirrored or diffuse) or transparent substrate of the projection screen. This method can be used to apply color-tinted particles 820, 822, and 824 to substrate 810 of the rear projection screen 800 of FIG. 8.

In another method, the colored elements are electrically charged so that they are attracted to a rotating drum and held in place. The colored elements are then transferred, according to a particular pattern, to a portion of an adhesive surface of a flexible or substantially rigid transparent sheet that also has an adhesive backing. Subsequently, the sheet is applied to a substrate of a frontal projection screen. Specifically, the drum is rotated through a reservoir containing colored elements of one of the colors to be deposited on the substrate, and these colored elements are written to the drum in a particular pattern and are subsequently transferred to the portion of the adhesive. The drum is rotated through a reservoir containing colored elements of another of the colors to be deposited on the substrate, and these colored elements are written to the drum in a particular pattern and are subsequently transferred to another portion of the adhesive. This is repeated for each of the colors. Alternatively, this method can be used to affix the colored elements to an adhesive applied to flexible or substantially rigid opaque (mirrored or diffuse) or transparent substrate of the projection screen. This method can be used to apply color-tinted particles 820, 822, and 824 to substrate 810 of the rear projection screen 800 of FIG. 8.

CONCLUSION

Although specific embodiments have been illustrated and described herein it is manifestly intended that the scope of the claimed subject matter be limited only by the following claims and equivalents thereof.

What is claimed is:

1. A projection screen comprising:
    a substrate;
    a single layer of particles adhered to the substrate, wherein the single layer of particles has a thickness of one particle and comprises:
        a plurality of first transparent particles tinted a first color; and
        a plurality of second transparent particles tinted a second color;
        wherein the first and second transparent particles are randomly distributed.

2. The projection screen of claim 1, wherein the substrate is a mirror reflector, a diffusive reflector, or a dark absorber.

3. The projection screen of claim 1, wherein an adhesive that adheres the first and second transparent particles to the substrate has a different index of refraction than the first and second particles.

4. The projection screen of claim 1, wherein an adhesive that adheres the first and second transparent particles to the substrate is opaque or transparent.

5. The projection screen of claim 1, wherein the single layer of particles further comprises other transparent particles tinted at least a third color.

6. The projection screen of claim 5, wherein the first, second, and third colors are respectively green, red and clue or cyan, magenta and yellow.

7. The projection screen of claim 5, wherein the other transparent particles tinted at least a third color are randomly distributed.

8. The projection screen of claim 1, wherein the single layer of particles further comprises a plurality of opaque reflective particles of various colors and/or a plurality of tinted mirror reflectors.

9. The projection screen of claim 1, wherein the first and second plurality of particles are selected from the group consisting of plastic, glass, spheres, and ellipsoids.

10. The projection screen of claim 1, wherein the first and second colors are respectively magenta and green.

11. The projection screen of claim 1, wherein the plurality of first and second particles are tinted using dyes or pigments.

12. The projection screen of claim 1, wherein a portion of the plurality of first and second particles is tinted and a remaining portion is untinted.

13. The projection screen of claim 1, wherein each of the plurality of first and second particles comprises a coating that is substantially a mirror reflector.

* * * * *

UNITED STATES PATENT AND TRADEMARK OFFICE
CERTIFICATE OF CORRECTION

PATENT NO. : 7,248,406 B2
APPLICATION NO. : 10/966009
DATED : July 24, 2007
INVENTOR(S) : Gregory J. May et al.

It is certified that error appears in the above-identified patent and that said Letters Patent is hereby corrected as shown below:

In column 7, line 2, in Claim 6, delete "red and clue" and insert -- red, and blue --, therefor.

In column 7, line 3, in Claim 6, after "magenta" insert -- , --.

Signed and Sealed this

Eighteenth Day of November, 2008

JON W. DUDAS
*Director of the United States Patent and Trademark Office*